(12) United States Patent
Gaspar

(10) Patent No.: US 9,226,153 B2
(45) Date of Patent: Dec. 29, 2015

(54) INTEGRATED IP TUNNEL AND AUTHENTICATION PROTOCOL BASED ON EXPANDED PROXY MOBILE IP

(71) Applicant: Cisco Technology, Inc., San Jose, CA (US)

(72) Inventor: Peter Gaspar, Vienna (AT)

(73) Assignee: Cisco Technology, Inc., San Jose, CA (US)

(*) Notice: Subject to any disclaimer, the term of this patent is extended or adjusted under 35 U.S.C. 154(b) by 147 days.

(21) Appl. No.: 13/974,179

(22) Filed: Aug. 23, 2013

(65) Prior Publication Data

US 2015/0058938 A1  Feb. 26, 2015

(51) Int. Cl.
*H04L 29/06* (2006.01)
*H04W 12/06* (2009.01)
*H04L 9/32* (2006.01)

(52) U.S. Cl.
CPC ............ *H04W 12/06* (2013.01); *H04L 9/3271* (2013.01)

(58) Field of Classification Search
CPC .... H04L 69/24; H04L 61/2015; H04L 9/3271
USPC .......................................................... 726/5
See application file for complete search history.

(56) References Cited

U.S. PATENT DOCUMENTS

| 8,584,209 | B1* | 11/2013 | Borapura et al. ................. 726/4 |
| 8,601,569 | B2* | 12/2013 | Segre et al. ..................... 726/15 |
| 2008/0219237 | A1* | 9/2008 | Thubert et al. ................. 370/349 |
| 2010/0046434 | A1* | 2/2010 | Weniger et al. ............... 370/328 |
| 2010/0185849 | A1* | 7/2010 | Rune et al. ..................... 713/156 |
| 2011/0026435 | A1* | 2/2011 | Weniger et al. ............... 370/254 |
| 2012/0300639 | A1* | 11/2012 | Janakiraman et al. ........ 370/241 |

OTHER PUBLICATIONS

Gundavelli, et al., "PMIPv6 inter-working with WiFi access authentication," Internet Engineering Task Force (IETF), Internet-Draft, Sep. 12, 2012, 15 pages.
Xia, et al., "PMIPv6 service negotiation based on EAP," Internet Engineering Task Force (IETF), Network Working Group, Internet-Draft, May 2007, 12 pages.
Korhonen, et al., "Diameter Mobile IPv6: Support for Home Agent to Diameter Server Interaction," Internet Engineering Task Force (IETF), Request for Comments: 5778, Feb. 2010, 34 pages.
Song, et al., "One-time Key Authentication Protocol for PMIPv6," Third 2008 International Conference on Convergence and Hybrid Information Technology, Nov. 11-13, 2008, 4 pages.

(Continued)

*Primary Examiner* — Izunna Okeke
*Assistant Examiner* — Bryan Wright
(74) *Attorney, Agent, or Firm* — Edell, Shapiro & Finnan, LLC

(57) ABSTRACT

A gateway is preconfigured to establish an Internet Protocol (IP) tunnel with a default local mobility anchor on behalf of a mobile node. The gateway receives from the mobile node an Internet access request including a mobile identifier and authorization and authentication protocol information, and sends to the default local mobility anchor an IP tunnel request to establish an IP tunnel. The gateway receives from the default local mobility anchor a tunnel redirect message to redirect the IP tunnel from the default local mobility anchor to a serving local mobility anchor and, responsive to the tunnel redirect message, authenticates the mobile node and establishes an IP tunnel with the serving local mobility anchor through which the mobile node communicates.

21 Claims, 6 Drawing Sheets

(56) References Cited

OTHER PUBLICATIONS

Gundavelli, et al., "Proxy Mobile IPv6," Internet Engineering Task Force (IETF), Network Working Group, Request for Comments: 5213, Aug. 2008, 92 pages.

Korhonen, et al., "Local Mobility Anchor (LMA) Discovery for Proxy Mobile IPv6," Internet Engineering Task Force (IETF), Request for Comments: 6097, Feb. 2011, 10 pages.

Aboba, et al., "RADIUS (Remote Authentication Dial in User Service) Support for Extensible Authentication Protocol (EAP)," Internet Engineering Task Force (IETF), Request for Comments: 3579, Sep. 2003, 46 pages.

Rigney, et al., "RADIUS Extensions," Internet Engineering Task Force (IETF), Network Working Group, Request for Comments: 2869, Jun. 2000, 48 pages.

Haverinen, et al., "Extensible Authentication Protocol Method for Global System for Mobile Communications (GSM) Subscriber Identity Modules (EAP-SIM)," Internet Engineering Task Force (IETF), Network Working Group, Request for Comments: 4186, Jan. 2006, 93 pages.

* cited by examiner

INTEGRATED IP TUNNEL AND AUTHENTICATION PROTOCOL BASED ON EXPANDED PROXY MOBILE IP

TECHNICAL FIELD

The present disclosure relates to wireless device network access using Internet Protocol (IP) tunnels and authentication.

BACKGROUND

Mobile wireless devices are capable of accessing the Internet from both private and community/public wireless local area networks (WLANs), e.g., Wi-Fi™ networks through a residential gateway. Before a given mobile wireless device is able to access the Internet through the residential gateway, the wireless device needs to be authorized and authenticated, and then assigned an Internet Protocol (IP) address for an Internet session.

The residential gateway is a focal point of this process and is configured to implement a variety of different communication protocols. The residential gateway may communicate with an authorization, authentication, and accounting (AAA) server to authenticate/authorize the wireless device in accordance with one or more authentication protocols, such as the Remote Authentication Dial In User Service (RADIUS). RADIUS operates in association with the Extensible Authentication Protocol (EAP). The residential gateway may also communicate with a local mobility anchor (LMA) in accordance with an IP tunneling protocol, such as Proxy Mobile IP version 6 (PMIPv6), to establish a PMIPv6 tunnel with the LMA. The residential gateway may also communicate with the wireless device in accordance with the Dynamic Host Configuration Protocol (DHCP). The number and complexity of the different protocols that need to be supported by the residential gateway increases the complexity and cost of the residential gateway.

A method comprising: at a gateway preconfigured to establish an Internet Protocol (IP) tunnel with a default local mobility anchor on behalf of a mobile node: receiving from the mobile node an Internet access request including a mobile identifier and authorization and authentication protocol information sending to the default local mobility anchor an IP tunnel request to establish an IP tunnel, the IP tunnel request including the mobile identifier and the authorization and authentication protocol information; receiving from the default local mobility anchor a tunnel redirect message to redirect the IP tunnel from the default local mobility anchor to a serving local mobility anchor; and in response to the tunnel redirect message, authenticating the mobile node and establishing an IP tunnel with the serving local mobility anchor through which the mobile node communicates, the authenticating the mobile node and establishing an IP tunnel including: sending to the serving local mobility anchor an IP tunnel request including the mobile node identifier and the authorization and authentication protocol information; receiving from the serving local mobility anchor an authentication challenge formatted as a Proxy-Binding acknowledgement message extended to include the authorization and authentication information; sending to the serving local mobility anchor an authentication response formatted as a Proxy-Binding Update message extended to include the mobile identifier and the authorization and authentication information; and receiving from the serving local mobility anchor a tunnel request acknowledgement that includes the mobile identifier and the authorization and authentication information.

DESCRIPTION OF EXAMPLE EMBODIMENTS

Overview

Techniques are presented in which a gateway both authenticates a mobile wireless device ("mobile node") and establishes an IP tunnel through which the authenticated mobile wireless device may exchange traffic via the Internet. A gateway is preconfigured to establish an Internet Protocol (IP) tunnel with a default local mobility anchor on behalf of a mobile node. The gateway receives from the mobile node an Internet access request including a mobile identifier and authorization and authentication protocol information, and sends to the default local mobility anchor an IP tunnel request to establish an IP tunnel. The IP tunnel request includes the mobile identifier and the authorization and authentication protocol information. The gateway receives from the default local mobility anchor a tunnel redirect message to redirect the IP tunnel from the default local mobility anchor to a serving local mobility anchor and, responsive to the tunnel redirect message, authenticates the mobile node and establishes an IP tunnel with the serving local mobility anchor through which the mobile node communicates.

Example Embodiments

Figure 1:
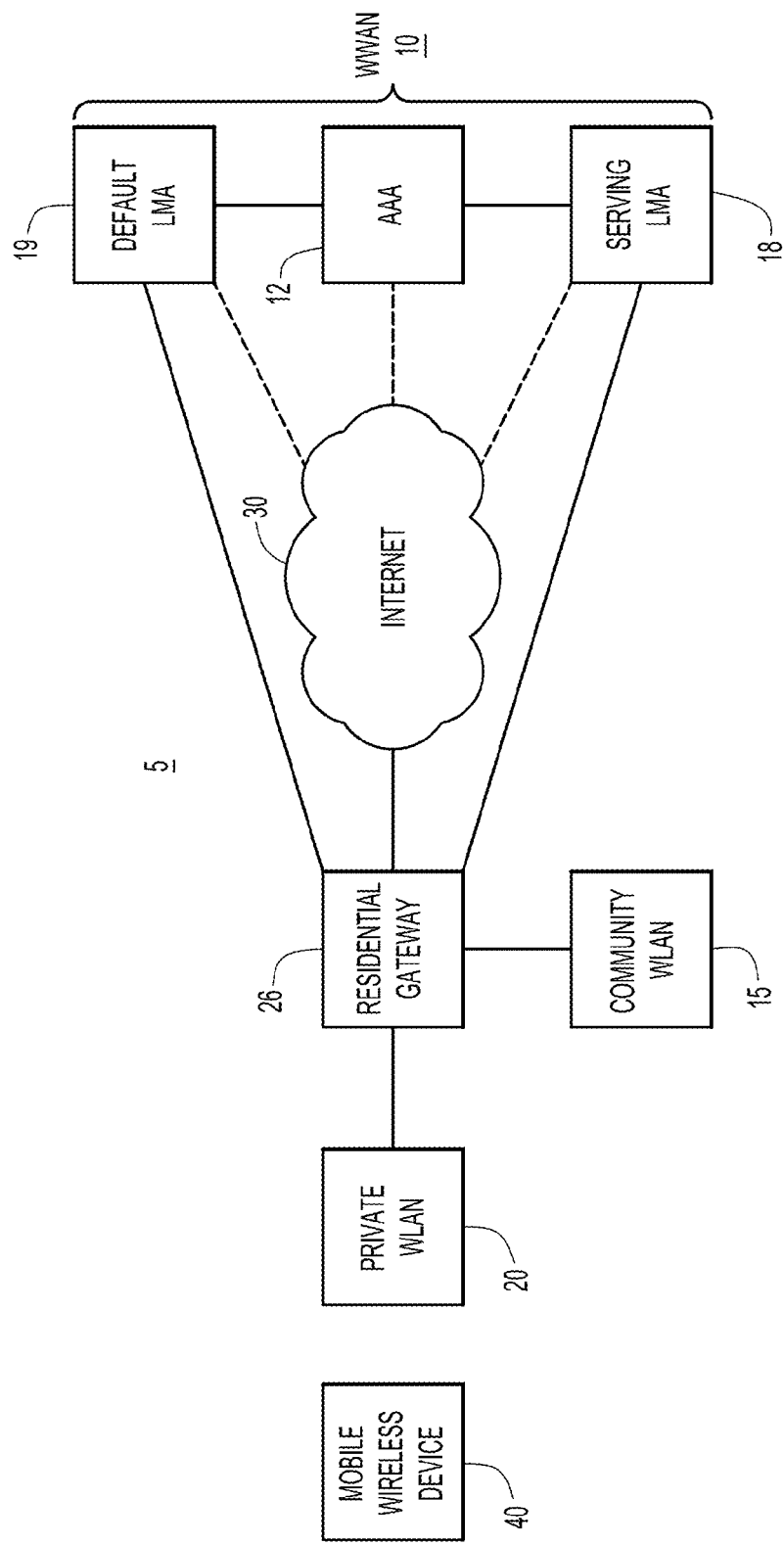
FIG. 1 is a block diagram showing integration of a wireless local area network and wireless wide area network in which the Proxy Mobile IPv6 (PMIPv6) protocol is extended to authenticate a mobile wireless device and establish a PMIPv6 tunnel for use by the authenticated mobile wireless device.

Referring first to FIG. 1, a block diagram is shown of a network environment 5 comprising a wireless wide area network (WWAN) 10, a community or public wireless local area network (WLAN) 15, and a private WLAN 20, each of which have connectivity to the Internet/World Wide Web (WWW) shown at reference numeral 30. An extension to the Proxy Mobile IP version 6 (PMIPv6) protocol is described herein to both authenticate a mobile wireless device and establish a PMIPv6 tunnel through which the authenticated mobile wireless device may exchange Internet messages. The extension to the PMIPv6 protocol presented herein integrates or combines into a single efficient protocol a PMIPv6 tunnel protocol and an authentication protocol. Thus, the extended PMIPv6 protocol presented herein is also referred to herein as an integrated IP tunnel and authentication protocol based on expanded/extended PMIP. The techniques described herein are applicable and useful for a network that employs Proxy PMIPv6; however, this is only by way of example and not intended to be limiting. Other tunnel protocols similar to PMIPv6 may also be integrated with authentication functions to achieve the efficiencies described herein.

The WWAN 10 is, for example, a 3G or 4G/LTE wireless network, or any wireless wide area network using technology now known or hereinafter developed. A mobile wireless device 40 is shown in FIG. 1 and is an example of a device that has WWAN connectivity and private/community WLAN connectivity capabilities, as is the case with most Smartphone™ devices currently available. The mobile wireless device 40 is also referred to herein as a mobile device or a mobile node (MN).

WWAN includes an authorization, authentication, and accounting (AAA) server 12 to authenticate requests from mobile nodes, such as mobile node 40, to connect with WWAN 10 and the Internet. In addition, AAA server 12 performs further functions, such as subscription based billing and authorization services, with respect to subscribing users of mobile nodes. The functions performed by AAA server 12 may be implemented across one or more server computers.

In a portion of the WWAN 10 referred to as the "mobile core network," not completely shown in FIG. 1, there are multiple local mobility anchors, including a serving local mobility anchor (LMA) 18 and a default LMA 19. The mobile core network may be an Evolved Packet Core network of a 3G network, for example. Serving LMA 18 is a router device, for example, that is configured to serve as the "home agent" for a mobile node in a Proxy Mobile IPv6 domain. It is the topological anchor point for the mobile node's home network prefix(es) and is the entity that manages the mobile node's binding state. Serving LMA 18 has the functional capabilities of a home agent as defined in Mobile IPv6 base specification (RFC3775) with the additional capabilities required for supporting Proxy Mobile IPv6 protocol, as defined in the specification of RFC 5213, and configured to support the expansions/modifications described herein. There are multiple serving LMAs in the core network of WWAN 10 because different mobile nodes may have different serving LMAs, but for simplicity, only one serving LMA is shown in FIG. 1. Default LMA 19 will be described below.

A Proxy Mobile IPv6 domain refers to a network where the mobility management of a mobile node is handled using the Proxy Mobile IPv6 protocol. The Proxy Mobile IPv6 domain includes LMAs and mobile access gateways, such as residential gateways, between which security associations can be set up and authorizations for sending Proxy Binding Updates on behalf of the mobile nodes can be ensured, as will be described in detail below.

Mobile node 40 may wirelessly connect to private WLAN 20 using a private key known to a subscriber, such as a wireless encryption protocol (WEP) key, or the like. Alternatively, mobile node 40 may wirelessly connect to community WLAN 15 without using a private key. To enable mobile nodes, such as mobile node 40, with access to WWAN 10 and the Internet, WLANs 15 and 20 each connect with a residential gateway (RG) 26 also referred to as a mobile access gateway (MAG) 26. RG 26 is, for example, a router or switch device.

RG 26 is prefigured or preregistered to initially establish connectivity with default LMA 19 when mobile node 40 initiates Internet/WWW 10 connectivity through the RG. That is, default LMA 19 serves as a default LMA for RG 26 with respect to attempts by mobile nodes to connect with the Internet through the RG. There are multiple default LMAs in the core network of WWAN 10 because different residential gateways have different default LMAs, but for simplicity only one default LMA is shown in FIG. 1.

RG 26 communicates with both default LMA 19 and also with serving LMA 18 when necessary, as will be described below. RG 26 communicates with LMAs 18 and 19 using any of a variety of protocols. For example, if the LMA 18 is part of a 3G network, it may use the expanded PMIPv6 described herein to support the techniques described herein.

The techniques described herein expand/extend PMIPv6 to include authentication and authorization functions heretofore unavailable in PMIPv6. The expanded PMIPv6 provides mobile nodes, such as mobile node 40, with authenticated access to networks such as WWAN 10 and the Internet through private and community WLANs 15 and 20 and RG 26, for example. The expanded PMIPv6 eliminates the need for RG 26 to communicate with AAA 12 in order to authenticate mobile node 40. Instead, RG 26 need only communicate with LMAs 18, 19. Thus, RG 26 need not implement separate authentication protocols used in AAA 12, such as RADIUS and EAP. This simplifies RG 26 and, more generally, simplifies the overall protocol requirements for network environment 5.

Figure 2:
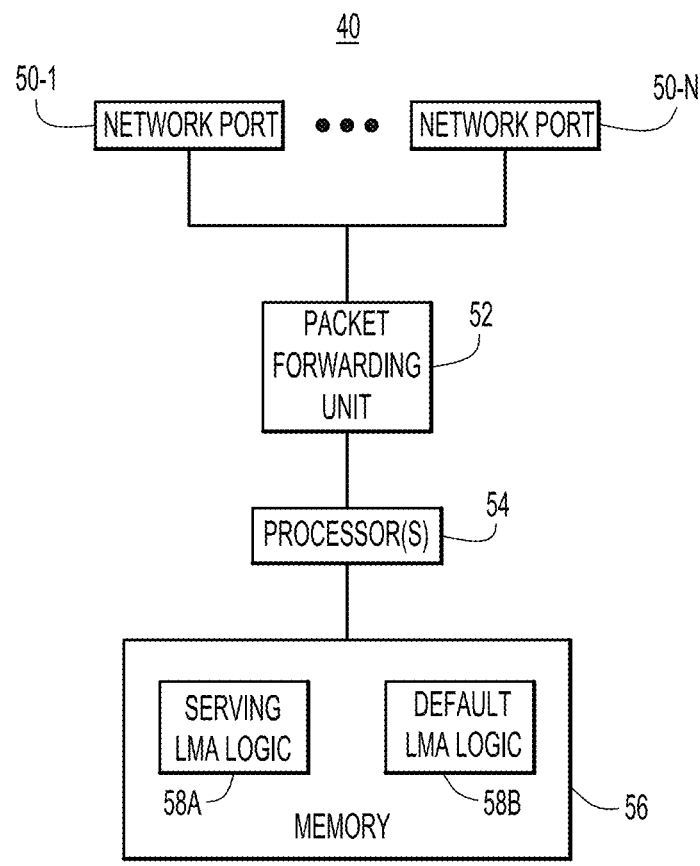
FIG. 2 is a block diagram of an example local mobility anchor (LMA) in a wireless wide area core network and configured to support the extended PMIPv6 techniques described herein.

Reference is now made to FIG. 2 for an example of a block diagram of an LMA 40 configured to perform the functions of both default LMA 19 and serving LMA 18. LMA 40 may be a network device, such as a router or switch, that has packet forwarding capabilities as well as computing/data processing capabilities. To this end, LMA 40 comprises a plurality of network ports 50-1 through 50-N, a packet forwarding unit 52, a processor 54 (or multiple processors) and memory 56. The memory stores instructions for LMA control logic including (i) serving LMA logic 58A that enables LMA 40 to perform the operations of a serving LMA (e.g., for serving LMA 18) as described herein, and (ii) default LMA logic 58B that enables LMA 40 to perform default LMA operations (e.g., for default LMA 19) as described herein, both in accordance with the expanded PMIPv6 protocol. In the embodiment depicted in FIG. 2, LMA 40 includes both serving and default logic 58A and 58B; however, in other embodiments, LMA 40 may include only logic 58A or logic 58B to implement the appropriate functionality.

Figure 3:
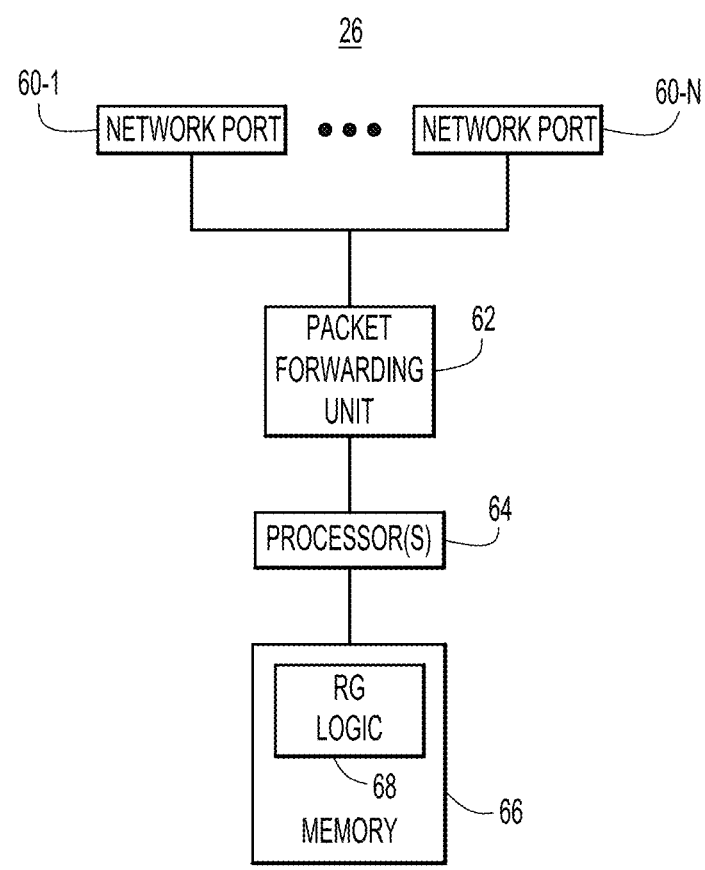
FIG. 3 is a block diagram of an example residential gateway in the wireless local area network and configured to support the extended PMIPv6 techniques described herein.

Similarly, FIG. 3 shows an example of a block diagram of RG 26. RG 26 may be a network device, such as a router or switch, that has packet forwarding capabilities as well as computing/data processing capabilities. RG 26 comprises a plurality of network ports 60-1 through 60-N, a packet forwarding unit 62, a processor 64 (or multiple processors) and memory 66. The memory stores instructions for RG logic 68 that enables RG 26 to perform RG operations in accordance with the expanded PMIPv6 as described herein.

The memories 56 and 66 shown in FIGS. 2 and 3 (and also memory 86 in FIG. 4 described below) may comprise read only memory (ROM), random access memory (RAM), magnetic disk storage media devices, optical storage media devices, flash memory devices, electrical, optical, or other physical/tangible (non-transitory) memory storage devices. The processors 54 and 64 are, for example, microprocessors or microcontrollers, that execute instructions stored in their respective memories. Thus, in general, the memories 56 and 66 may comprise one or more tangible computer readable storage media (e.g., a memory device) encoded with software comprising computer executable instructions and when the software is executed (by the processors 54 and 64, respectively) it is operable to perform the operations described herein.

Figure 4:
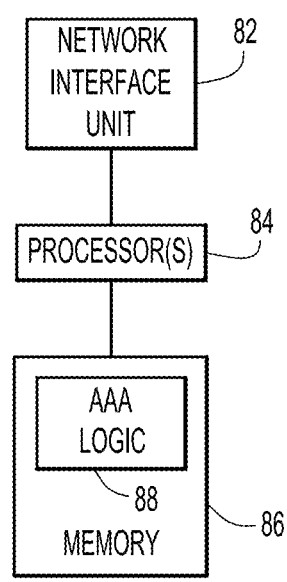
FIG. 4 is a block diagram of an authorization, authentication, and accounting (AAA) server and configured to perform AAA operations in support of the extended PMIPv6 techniques described herein.

FIG. 4 illustrates an example block diagram of AAA server 12. AAA server 12 is a computing device, e.g., a server, that comprises a network interface unit 82, a processor (or multiple processors) 84 and memory 86. The memory 86 stores instructions for AAA logic 88 that enables the AAA server to perform AAA operations in accordance with the expanded/modified PMIPv6 protocol as described herein.

Figure 5:
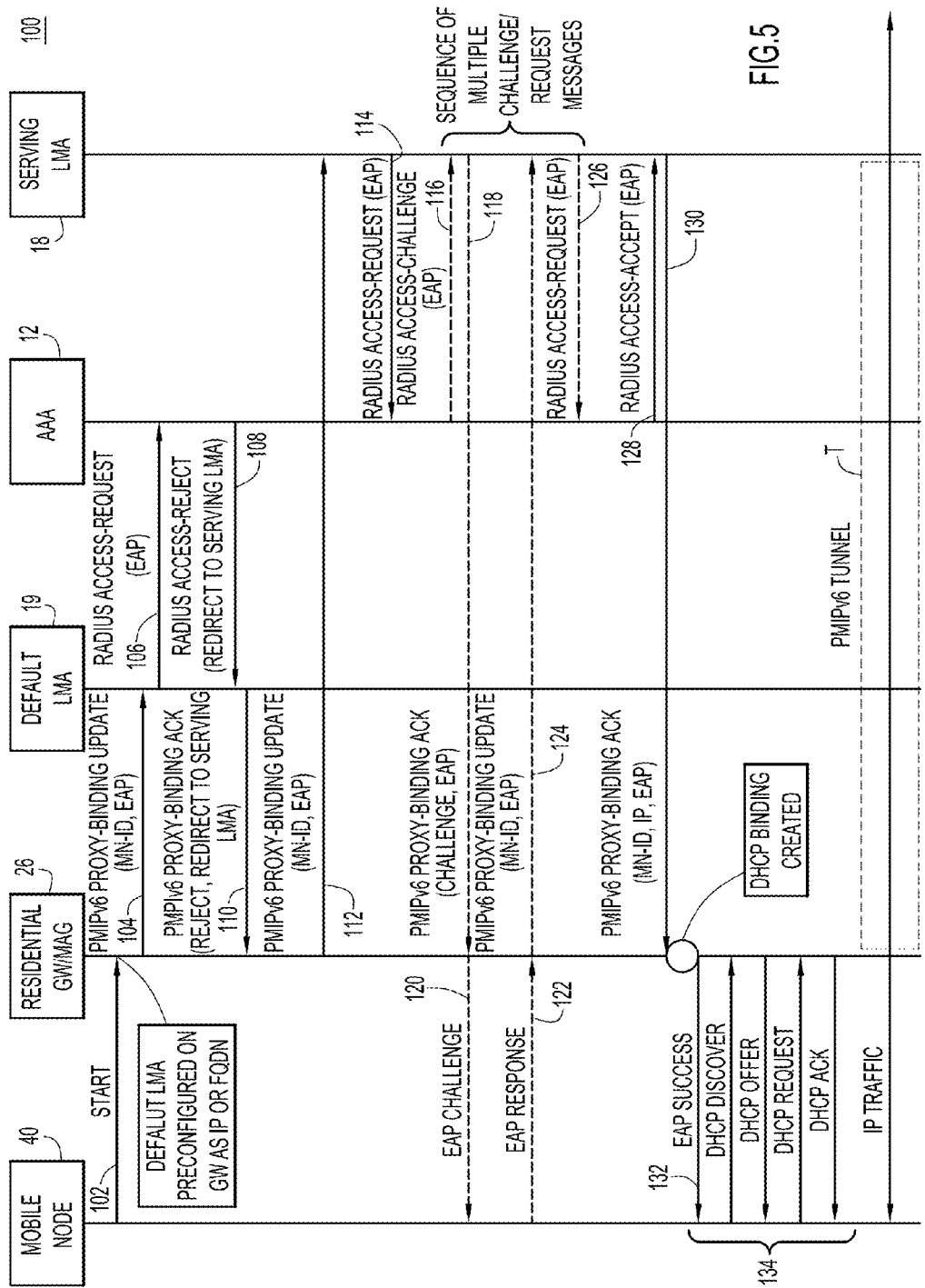
FIG. 5 depicts a ladder diagram for message flow to authenticate a mobile node for access to the Internet and establish a PMIPv6 tunnel between the residential gateway and the serving LMA according to the techniques presented herein.

FIG. 5 depicts a message flow in network environment 5 in accordance with the expanded PMIPv6. Serving LMA 18, default LMA 19, AAA 12, and RG 26 execute serving LMA logic 58A, default LMA logic 58B, AAA logic 88, and RG logic 68, respectively, in performing their operational parts of the message flow depicted in FIG. 5.

Message flow begins when mobile node 40 initially connects to RG 26 through either of WLANs 15 and 20 and sends an Internet access request 102, a "Start" message or authentication request, to the RG to gain authenticated access to the Internet. The Start message includes a mobile node identifier (MN-ID), such as a MAC address of mobile node 40. The Start message signals a start of a process between mobile node 40 and RG 26 to authenticate the mobile node in accordance with an authentication protocol, such as EAP. EAP is an encapsulation protocol for numerous authentication methods that differ from one another in terms of message flow and message content. Known EAP methods/protocols supported by the techniques provided herein include, but are not limited to, EAP-MD5, EAP-OTP (One-Time Password), EAP-TLS (Transport Layer Security), EAP-TTLS (Tunneled TLS), EAP-GTC (Generic Token Card), EAP-MSCHAPv2 (Microsoft Challenge-Handshake Authentication Protocol (CHAP)), EAP-FAST (Flexible Authentication via Secure Tunneling), and EAP-SIM (Subscriber Identity Module). Messages exchanged between the various entities depicted in FIG. 5 may include authentication/authorization information according to the particular authentication protocol. Authentication/authorization information formatted and exchanged in accordance with EAP is referred to herein as EAP information. The EAP information varies depending on which of the EAP methods is implemented in a given embodiment. For example, in an embodiment in which EAP-SIM is used, an International Mobile Subscriber Identity (IMSI) may be used as an identity of mobile node 40.

RG 26 is preconfigured or preregistered to initially connect to default LMA 19 and establish a PMIPv6 tunnel with the default LMA 19 in response to Internet access request 102 from mobile node 40. RG 26 may be preconfigured in this way based on an IP address of the RG or indirectly by a fully qualified domain name (FQDN) constructed from the MN-ID received in request 102.

In response to the Start message, at 104, RG 26 sends a tunnel request message to default LMA 19 to establish a PMIPv6 tunnel with the default LMA 19 to carry messages (e.g., Internet packets) to and from mobile node 40. The tunnel request message may be a PMIPv6-based Proxy-Binding Update (PBU) expanded to include both the MN-ID and necessary EAP information related to the mobile node, such as the ISMI for EAP-SIM. The expanded PBU (i) requests to establish a binding between mobile node 40 and a care-of address (Proxy-CoA), and ultimately, to solicit an assigned IP address for mobile node 40, and (ii) forwards the EAP information necessary for an LMA to initiate an authentication session with AAA 12 on behalf of mobile node 40.

The MN-ID is carried or contained in the MN-I option of the expanded PBU. The EAP information is carried in a new or expanded field of the expanded PBU message. More specifically, the expanded PBU may contain the following fields: HI, MN_ID, SSMN, ANI, Geo-Loc IPv4-HoAReq, HNP, lifetime, and EAP information (the new/expanded field), where HI stands for Handover Hint (HI), SSMN stands for Service Selection Mobility (SSM) option, ANI stands for Access Network Information (ANI) option, HoA stands for Home Address, and HNP stands for Home Network Prefix. The values in the PBU message sent by the RG 26 at are: HI=New-Attach, MN-Id=MAC Address, SSMN=Default-APN, ANI=SSID, Geo-Loc IPv4-HoAReq=0.0.0.0 and HNP=0::0/64, and lifetime=some period of time, e.g., 3 minutes.

Because RG 26 forwarded the EAP information to default LMA 19 at 104, the default LMA 19 now possesses the information necessary to initiate an authentication session with AAA 12 on behalf of mobile node 40 instead of the RG 26, which simplifies the operational and protocol burden on the RG 26.

At 106, default LMA 19 initiates an authentication session with AAA 12. Default LMA 19 sends an Access-Request message including the MN-ID and the EAP information from the expanded PBU to AAA 12. The Access-Request message at 106 may be formatted in accordance with a Remote Authentication Dial In User Service (RADIUS) protocol in association with EAP or a similar authentication protocol. In part, the Access-Request message serves as a query to AAA 12 for an identity (i.e., an IP address) of a serving LMA (e.g., serving LMA 18) for mobile node 40 based on the MN-ID.

In response to the Access-Request message received at 106, AAA 12 determines an identity of an appropriate serving LMA based on the MN-ID (and EAP information). The serving LMA may be any of a subscription-based home LMA of mobile node 40, an LMA that holds a current PMIPv6 session of the mobile node, or a new LMA that will become a serving LMA for the mobile node. A benefit of delegating to AAA 12 the responsibility of identifying the serving LMA is that the AAA can load-balance among multiple serving LMAs a large number of new mobile node sessions resulting from Internet access requests, such as request 102.

At 108, assuming a case in which the default LMA and the serving LMA are different from each other, AAA 12 sends an Access-Reject message to RG 26 including the identity (e.g., IP address) of the serving LMA (e.g., serving LMA 18). The Access-Reject message serves as a tunnel redirect message that redirects RG 26 to establish the PMIPv6 tunnel with serving LMA 18 instead of default LMA 19.

At 110, in response to the Access-Reject message at 108, default LMA 19 sends a tunnel reject and redirect message to RG 26. The message at 110 may be a PMIPv6 Proxy-Binding Ack (PBA) message expanded to include both a reject indicator and a redirect indicator that redirects RG 26 to serving LMA 18.

At 112, in response to the redirect message at 110, RG 26 sends another tunnel request message, but this time to serving LMA 18 to establish a PMIPv6 tunnel with the serving LMA. Like before, the second tunnel request message may be a PMIPv6-based PBU expanded to include both the MN-ID and EAP information related to the mobile node.

Because RG 26 forwarded the EAP information to serving LMA 18 at 112, the serving LMA now possesses the information necessary to initiate an authentication session with AAA 12 on behalf of mobile node 40 instead of the RG, which further simplifies the operational and protocol burden on the RG.

In response to the expanded PBU at 112, serving LMA 18 initiates (i) an authentication session with AAA 12 to authenticate mobile node 40 in accordance with the RADIUS protocol in association with EAP (actions 114, 116, 126, and 128 described below), and (ii) a series of Challenges/Requests with RG 26 in accordance with the expanded PMIPv6 PBU and PBA (actions 118 and 124 described below). The authentication session and series of Challenges/Requests use the EAP information exchanged between mobile node 40 and AAA 12.

At 114, serving LMA 18 sends to AAA 12 an Access-Request message including EAP information to initiate an authentication session with the AAA to authenticate mobile node 40.

At 116, AAA 12 sends to serving LMA 18 an Access-Challenge message including EAP information. For example, the EAP-SIM information may include an authentication key exchange, i.e., triplets for a keying algorithm.

The Access-Request and Access-Challenge messages may be formatted in accordance with the RADIUS protocol or a similar authentication protocol.

At 118, serving LMA 18 sends to RG 26 an EAP Challenge message, which may be formatted as a PMIPv6 PBA message expanded to include both the MN-ID and the EAP information.

At 120 the EAP Challenge at 118 is forwarded from RG 26 to mobile node 40. The EAP Challenge solicits further EAP information from mobile node 40. The EAP information may include a public key, an encryption challenge, or triplets for a keying algorithm.

At 122, mobile node 40 sends to RG 26 an EAP response to the challenge at 120. The EAP response includes the EAP information solicited at 120. The EAP information may include either an encrypted password or results of the keying algorithm mentioned in connection with operation 120.

At 124, RG 26 forwards to serving LMA 18 the EAP response from mobile node 40 in the form of a PMIPv6 PBU expanded to include both the MN-ID and the EAP information returned by mobile node 40.

At 126, serving LMA 18 sends to AAA 12 an Access-Request message including the EAP information that was returned by mobile node 40 and received by LMA 18 at 124. Depending on the EAP method, operations 116-126 may be repeated one or more times.

At 128, assuming the returned EAP information satisfies authentication requirements, AAA 12 sends to serving LMA 18 an Access-Accept message indicating a successful authentication of mobile node 40 based on the returned EAP information. If the serving LMA 18 serves as a networking policy enforcement node in WWAN 10, AAA 12 may also send to the serving LMA networking policy information associated with mobile node 40 that is based on a user/subscriber profile for the mobile node.

At 130, serving LMA 18 sends to RG 26 a message that indicates the successful authentication and includes information necessary for mobile node 40 to gain access to the Internet, such as an assignment of an IP address to mobile node 40. The assigned IP address may be an IPv4 address or, alternatively, an IPv6 prefix. The message at 130 may be formatted as a PMIPv6 PBA expanded to include the MN-ID, the assigned IP address, and the EAP information associated with the successful authentication of the mobile node. RG 26 stores the assigned IP address in a table, such as a Dynamic Host Configuration Protocol (DHCP) binding table. Accordingly, the PBA at 130 results in successful DHCP binding that is necessary to later provide the IP address to the MN (at 134, described below). The expanded PBA at 130 has similar fields as the expanded PBU described above, including a new/expanded field to contain the EAP information.

At 132, RG 26 sends to mobile node 40 an EAP Success message indicating the successful authentication of the mobile node and that the mobile node is now allowed to connect with the Internet.

At 134, RG 26 and mobile node 40 exchange DHCP messages to finalize a network connection. The DHCP messages include Discover, Offer, Request, and Ack messages through which mobile node 40 requests and receives the assigned IP address from RG 26.

The above-described flow assumes a case in which default LMA 19 and serving LMA 18 are different. In a case where LMA 19 and serving LMA 18 are the same, AAA 12 need not issue the redirect message at 108. Instead, message flow omits redirect-related operations 108-112 and jumps straight to operation 114. Beginning with operation 114, RG 26, AAA 12, and mobile node 40 communicate with default LMA 19 instead of serving LMA 18.

Figure 6:
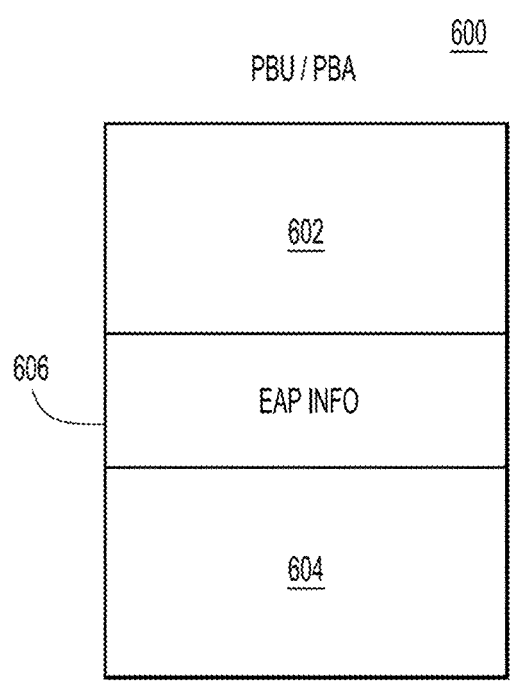
FIG. 6 is an illustration of a PMIPv6 Proxy-Binding Update (PBU) expanded to include authentication information and a PMIPv6 Proxy-Binding Ack (PBA) expanded to include authentication information.

Reference is now made to FIG. 6. FIG. 6 is an illustration of an expanded PMIPv6 PBA or PBU message 600. Message 600 includes fields 602 and 604 that contain PMIPv6 information as currently defined in the PMIPv6. Message 600 also includes field 606 that contains EAP information as described above. EAP information includes (i) an EAP header that defines a code, identifier, and a length, and (ii) EAP data. The header code may identify: request; response; success; failure; initiate; and finish. The header identifier is used to match EAP requests and responses. The length gives the length of the EAP data. EAP data types include but are not limited to Identity, Notification, Nak, Challenge, One-Time Password, GTC, Key Exchange, and so on.

As presented in the foregoing, techniques are provided to expand PMIPv6 to include/integrate an authentication protocol. The result is a single IP tunnel and authentication protocol that is efficient. For example, a residential gateway providing Internet access to a mobile wireless device need only implement the expanded PMIPv6 to establish an IP tunnel and initiate authentication on behalf of the device. The expanded PMIPv6 obviates the need for the residential gateway to interact with an AAA server. Instead, the expanded PMIPv6 offloads this requirement to a default LMA and a serving LMA. The expanded PMIPv6 is achieved through expanded PMIPv6 PBU and PBA definitions and a new messaging sequence among the residential gateway, the default and serving LMAs, and the AAA server.

In summary, in one form, a method is provided comprising A method, comprises: at a gateway preconfigured to establish an Internet Protocol (IP) tunnel with a default local mobility anchor on behalf of a mobile node: receiving from the mobile node an Internet access request including a mobile identifier and authorization and authentication protocol information; sending to the default local mobility anchor an IP tunnel request to establish an IP tunnel, the IP tunnel request including the mobile identifier and the authorization and authentication protocol information; receiving from the default local mobility anchor a tunnel redirect message to redirect the IP tunnel from the default local mobility anchor to a serving local mobility anchor; and in response to the tunnel redirect message, authenticating the mobile node and establishing an IP tunnel with the serving local mobility anchor through which the mobile node communicates.

Similarly, an apparatus is provided comprising: one or more network ports to receive messages from and transmit messages to a network; a packet forwarding unit configured to process and forward messages over the network; and a processor coupled to the packet forwarding unit. The processor is configured to: receive from a mobile node an Internet access request including a mobile identifier and authorization and authentication protocol information; send to a default local mobility anchor, with which the apparatus is preconfigured to establish an Internet Protocol (IP) tunnel on behalf of the mobile node, an IP tunnel request to establish an IP tunnel, the IP tunnel request including the mobile identifier and the authorization and authentication protocol information; receive from the default local mobility anchor a tunnel redirect message to redirect the IP tunnel from the default local mobility anchor to a serving local mobility anchor; and in response to the tunnel redirect message, authenticate the mobile node and establish an IP tunnel with the serving local mobility anchor through which the mobile node communicates.

In still another form, provide herein is one or more computer readable storage media encoded with software comprising computer executable instructions operable to: receive at a gateway from a mobile node an Internet access request including a mobile identifier and authorization and authentication protocol information; send to a default local mobility anchor, with which the gateway is preconfigured to establish an Internet Protocol (IP) tunnel on behalf of the mobile node, an IP tunnel request to establish an IP tunnel, the IP tunnel request including the mobile identifier and the authorization and authentication protocol information; receive from the default local mobility anchor a tunnel redirect message to redirect the IP tunnel from the default local mobility anchor to a serving local mobility anchor; and in response to the tunnel redirect message, authenticate the mobile node and establish an IP tunnel with the serving local mobility anchor through which the mobile node communicates.

Although the apparatus, method, and computer program product are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
    at a gateway preconfigured to establish an Internet Protocol (IP) tunnel with a default local mobility anchor on behalf of a mobile node:
        receiving from the mobile node an Internet access request including a mobile identifier and authorization and authentication protocol information
        sending to the default local mobility anchor an IP tunnel request to establish an IP tunnel, the IP tunnel request including the mobile identifier and the authorization and authentication protocol information;
        receiving from the default local mobility anchor a tunnel redirect message to redirect the IP tunnel from the default local mobility anchor to a serving local mobility anchor; and
        in response to the tunnel redirect message, authenticating the mobile node and establishing an IP tunnel with the serving local mobility anchor through which the mobile node communicates, the authenticating the mobile node and establishing an IP tunnel including:
            sending to the serving local mobility anchor an IP tunnel request including the mobile node identifier and the authorization and authentication protocol information;
            receiving from the serving local mobility anchor an authentication challenge formatted as a Proxy-Binding acknowledgement message extended to include the authorization and authentication information;
            sending to the serving local mobility anchor an authentication response formatted as a Proxy-Binding Update message extended to include the mobile identifier and the authorization and authentication information; and
            receiving from the serving local mobility anchor a tunnel request acknowledgement that includes the mobile identifier and the authorization and authentication information.

2. The method of claim 1, wherein the authentication challenge solicits mobile node credentials to be used for authentication of the mobile node, and wherein the authenticating the mobile node and establishing an IP tunnel includes, after sending the IP tunnel request to the serving local mobility anchor:
    sending the authentication challenge to the mobile node;
    receiving from the mobile node an authentication response including the solicited mobile node credentials; and
    sending the solicited mobile node credentials to the serving local mobility anchor in the authentication response.

3. The method of claim 2, wherein the authenticating the mobile node and establishing an IP tunnel includes authenticating the mobile node in accordance with the extensible authentication protocol (EAP), and the authorization and authentication information includes EAP information.

4. The method of claim 2, wherein:
    the authentication challenge received from the serving local mobility anchor is formatted as a Proxy Mobile IPv6 (PMIPv6) Proxy-Binding Ack message extended to include the authorization and authentication information; and
    the authentication response sent to the serving local mobility anchor is formatted as a PMIPv6 Proxy-Binding Update message including the mobile identifier and extended to include the authorization and authentication information.

5. The method of claim 2, wherein the authenticating the mobile node and establishing an IP tunnel includes, after sending the solicited mobile node credentials to the serving local mobility anchor in the authentication response, receiving the tunnel request acknowledgement as an indication that the mobile node is authenticated from the serving local mobility anchor.

6. The method of claim 5, wherein the authenticating the mobile node and establishing an IP tunnel further includes, after receiving the tunnel request acknowledgement as the indication that the mobile node is authenticated, exchanging Dynamic Host Configuration Protocol (DHCP) messages with the mobile node after which the mobile node is able to communicate through the IP tunnel.

7. The method of claim 5, wherein:
    the IP tunnel request is a Proxy Mobile IPv6 (PMIPv6) Proxy-Binding Update message including the mobile identifier and extended to include the authorization and authentication information; and
    the tunnel request acknowledgement is a PMIPv6 Proxy-Binding Ack message including the mobile identifier and an IP address assigned to the mobile node, and extended to include the authorization and authentication information.

8. An apparatus configured as a gateway, comprising: one or more network ports to receive messages from or transmit messages to a network; a packet forwarding logic interface configured to process and forward messages over the network;

a processor coupled to the packet forwarding logic interface, and configured to:

receive from a mobile node an Internet access request including a mobile identifier and authorization and authentication protocol information;

send to a default local mobility anchor, with which the apparatus is preconfigured to establish an Internet Protocol (IP) tunnel on behalf of the mobile node, an IP tunnel request to establish an IP tunnel, the IP tunnel request including the mobile identifier and the authorization and authentication protocol information; receive from the default local mobility anchor a tunnel redirect message to redirect the IP tunnel from the default local mobility anchor to a serving local mobility anchor;

and in response to the tunnel redirect message, authenticate the mobile node and establish an IP tunnel with the serving local mobility anchor through which the mobile node communicates, wherein the processor is configured to authenticate the mobile node and establish an IP tunnel with the serving local mobility anchor by:

sending to the serving local mobility anchor an IP tunnel request including the mobile node identifier and the authorization and authentication protocol information;

receiving from the serving local mobility anchor an authentication challenge formatted as a Proxy-Binding acknowledgement message extended to include the authorization and authentication information;

sending to the serving local mobility anchor an authentication response formatted as a Proxy-Binding Update message extended to include the mobile identifier and the authorization and authentication information:

and receiving from the serving local mobility anchor a tunnel request acknowledgement that includes the mobile identifier and the authorization and authentication information.

9. The apparatus of claim 8, wherein the authentication challenge solicits mobile node credentials to be used for authentication of the mobile node, and wherein the processor is configured to authenticate the mobile node and establish an IP tunnel by, after sending the IP tunnel request to the serving local mobility anchor:

sending the authentication challenge to the mobile node;

receiving from the mobile node an authentication response including the solicited mobile node credentials; and sending the solicited mobile node credentials to the serving local mobility anchor in the authentication response.

10. The apparatus of claim 9, wherein the processor is configured to authenticate the mobile node and establish an IP tunnel by authenticating the mobile node in accordance with the extensible authentication protocol (EAP), and the authorization and authentication information includes EAP information.

11. The apparatus of claim 9, wherein:

the authentication challenge received from the serving local mobility anchor is formatted as a Proxy Mobile IPv6 (PMIPv6) Proxy-Binding Ack message extended to include the authorization and authentication information; and the authentication response sent to the serving local mobility anchor is formatted as a PMIPv6 Proxy-Binding Update message including the mobile identifier and extended to include the authorization and authentication information.

12. The apparatus of claim 9, wherein the processor is configured to authenticate the mobile node and establish an IP tunnel by, after sending the solicited mobile node credentials to the serving local mobility anchor in the authentication response, receiving the tunnel request acknowledgement as an indication that the mobile node is authenticated from the serving local mobility anchor.

13. The apparatus of claim 12, wherein the processor is further configured to authenticate the mobile node and establish an IP tunnel by, after receiving the tunnel request acknowledgement as the indication that the mobile node is authenticated, exchanging Dynamic Host Configuration Protocol (DHCP) messages with the mobile node after which the mobile node is able to communicate through the IP tunnel.

14. The apparatus of claim 12, wherein:

the IP tunnel request is a Proxy Mobile IPv6 (PMIPv6) Proxy-Binding Update message including the mobile identifier and extended to include the authorization and authentication information; and the tunnel request acknowledgement is a PMIPv6 Proxy-Binding Ack message including the mobile identifier and an IP address assigned to the mobile node, and extended to include the authorization and authentication information.

15. A non-transitory processor readable medium storing instructions that, when executed by a processor, cause the processor to:

at a gateway: receive from a mobile node an Internet access request including a mobile identifier and authorization and authentication protocol information;

send to a default local mobility anchor, with which the gateway is preconfigured to establish an Internet Protocol (IP) tunnel on behalf of the mobile node, an IP tunnel request to establish an IP tunnel, the IP tunnel request including the mobile identifier and the authorization and authentication protocol information;

receive from the default local mobility anchor a tunnel redirect message to redirect the IP tunnel from the default local mobility anchor to a serving local mobility anchor; and in response to the tunnel redirect message, authenticate the mobile node and establish an IP tunnel with the serving local mobility anchor through which the mobile node communicates, wherein the instructions to cause the processor to authenticate the mobile node and establish an IP tunnel including instructions to cause the processor to:

send to the serving local mobility anchor an IP tunnel request including the mobile node identifier and the authorization and authentication protocol information;

receive from the serving local mobility anchor an authentication challenge formatted as a Proxy-Binding acknowledgement message extended to include the authorization and authentication information;

send to the serving local mobility anchor an authentication response formatted as a Proxy-Binding Update message extended to include the mobile identifier and the authorization and authentication information; and receive from the serving local mobility anchor a tunnel request acknowledgement that includes the mobile identifier and the authorization and authentication information.

16. The processor readable medium of claim 15, wherein the authentication challenge solicits mobile node credentials to be used for authentication of the mobile node, and wherein the instructions to cause the processor to authenticate the mobile node and establish an IP tunnel include instructions to cause the processor to, after sending the IP tunnel request to the serving local mobility anchor:

send the authentication challenge to the mobile node;
receive from the mobile node an authentication response including the solicited mobile node credentials; and
send the solicited mobile node credentials to the serving local mobility anchor in the authentication response.

17. The processor readable medium of claim 16, wherein the instructions to cause the processor to authenticate the mobile node and establish an IP tunnel include instructions to cause the processor to authenticate the mobile node in accordance with the extensible authentication protocol (EAP), and the authorization and authentication information includes EAP information.

18. The processor readable medium of claim 16, wherein:
the authentication challenge received from the serving local mobility anchor is formatted as a Proxy Mobile IPv6 (PMIPv6) Proxy-Binding Ack message extended to include the authorization and authentication information; and
the authentication response sent to the serving local mobility anchor is formatted as a PMIPv6 Proxy-Binding Update message including the mobile identifier and extended to include the authorization and authentication information.

19. The processor readable medium of claim 16, wherein the instructions to cause the processor to authenticate the mobile node and establish an IP tunnel include instructions to cause the processor to, after sending the solicited mobile node credentials to the serving local mobility anchor in the authentication response, receive the tunnel request acknowledgement as an indication that the mobile node is authenticated from the serving local mobility anchor.

20. The processor readable medium of claim 19, wherein the instructions to cause the processor to authenticate the mobile node and establish an IP tunnel include instructions to cause the processor to, after receiving the tunnel request acknowledgement as the indication that the mobile node is authenticated, exchanging Dynamic Host Configuration Protocol (DHCP) messages with the mobile node after which the mobile node is able to communicate through the IP tunnel.

21. The processor readable medium of claim 19, wherein:
the IP tunnel request is a Proxy Mobile IPv6 (PMIPv6) Proxy-Binding Update message including the mobile identifier and extended to include the authorization and authentication information; and
the tunnel request acknowledgement is a PMIPv6 Proxy-Binding Ack message including the mobile identifier and an IP address assigned to the mobile node, and extended to include the authorization and authentication information.

* * * * *